United States Patent
Petruzzo

(10) Patent No.: US 8,473,465 B2
(45) Date of Patent: Jun. 25, 2013

(54) DATA MIRRORING SYSTEM

(75) Inventor: Stephen E. Petruzzo, Great Falls, VA (US)

(73) Assignee: GreenTec-USA, Inc., Reston, VA (US)

( * ) Notice: Subject to any disclaimer, the term of this patent is extended or adjusted under 35 U.S.C. 154(b) by 0 days.

(21) Appl. No.: 12/910,903

(22) Filed: Oct. 25, 2010

(65) Prior Publication Data

US 2011/0035563 A1 Feb. 10, 2011

Related U.S. Application Data

(60) Division of application No. 11/459,564, filed on Jul. 24, 2006, now Pat. No. 7,822,715, which is a continuation-in-part of application No. 11/274,886, filed on Nov. 16, 2005, now abandoned.

(60) Provisional application No. 60/627,971, filed on Nov. 16, 2004.

(51) Int. Cl.
*G06F 7/00* (2006.01)

(52) U.S. Cl.
USPC .......................................................... 707/659

(58) Field of Classification Search
USPC .......................................................... 707/659
See application file for complete search history.

(56) References Cited

U.S. PATENT DOCUMENTS

| | | |
|---|---|---|
| 5,408,644 A | 4/1995 | Schneider et al. |
| 5,857,208 A | 1/1999 | Ofek |
| 6,182,198 B1 | 1/2001 | Hubis et al. |
| 6,237,008 B1 | 5/2001 | Beal et al. |
| 6,353,878 B1 | 3/2002 | Dunham |
| 6,487,636 B1 | 11/2002 | Dolphin et al. |
| 6,557,089 B1 | 4/2003 | Reed et al. |
| 6,748,504 B2 | 6/2004 | Sawdon et al. |
| 6,823,336 B1 | 11/2004 | Srinivasan et al. |
| 7,069,466 B2 | 6/2006 | Trimmer et al. |
| 7,103,797 B1 * | 9/2006 | Wahl et al. .................. 714/6.12 |
| 7,203,732 B2 | 4/2007 | McCabe et al. |
| 7,328,366 B2 | 2/2008 | Michelman |
| 7,330,997 B1 | 2/2008 | Odom |
| 7,334,101 B2 | 2/2008 | Yagawa et al. |
| 7,415,589 B2 | 8/2008 | Hirakawa et al. |
| 7,447,692 B2 | 11/2008 | Oshinsky et al. |
| 7,627,776 B2 | 12/2009 | Petruzzo |
| 7,822,715 B2 | 10/2010 | Petruzzo |
| 2001/0042222 A1 | 11/2001 | Kedem et al. |

(Continued)

OTHER PUBLICATIONS

Chalaka, Ravi, "Examining Data Replication and Data Mirroring Technologies as Part of a Disaster Recovery Plan," Continuity Central, Sep. 10, 2004, printed Nov. 16, 2004.

Hasenstein, Michael, "The Logical Volume Manager (LVM)—Part 1," http://www.suse.de/en/whitepapers/lvm/lvm1.html, SUSE Inc., 2001, printed Nov. 3, 2005.

Karstensen, Holger, et al., "Parallel Optical Link (PAROLI) for Multichannel Gigabit Rate Interconnections," Electronic Components and Technology Conference, 1998.

(Continued)

*Primary Examiner* — Jensen Hu
(74) *Attorney, Agent, or Firm* — Cahn & Samuels, LLP

(57) ABSTRACT

A system includes a primary storage unit connected to a secondary storage unit such that data written to the primary storage unit is replicated on the secondary storage unit. The primary storage unit in at least one exemplary embodiment includes the capability to intercept input/output instructions for routing to a buffer and/or directly to the secondary storage unit. The system in at least one exemplary embodiment includes a backup storage unit for backing up data from at least the secondary storage unit offline and the capability to update the secondary storage unit once it returns to an online status.

20 Claims, 13 Drawing Sheets

U.S. PATENT DOCUMENTS

| | | | |
|---|---|---|---|
| 2002/0069317 A1 | 6/2002 | Chow et al. | |
| 2002/0083053 A1 | 6/2002 | Richard et al. | |
| 2002/0188800 A1* | 12/2002 | Tomaszewski et al. | 711/112 |
| 2003/0140070 A1 | 7/2003 | Kaczmarski et al. | |
| 2003/0170012 A1 | 9/2003 | Cochran | |
| 2004/0030852 A1 | 2/2004 | Coombs et al. | |
| 2004/0030951 A1 | 2/2004 | Armangau | |
| 2004/0031030 A1* | 2/2004 | Kidder et al. | 717/172 |
| 2005/0081008 A1 | 4/2005 | Gold et al. | |
| 2006/0212465 A1* | 9/2006 | Fish et al. | 707/101 |
| 2006/0253731 A1 | 11/2006 | Petruzzo | |
| 2006/0259723 A1 | 11/2006 | Petruzzo | |
| 2006/0271605 A1 | 11/2006 | Petruzzo | |
| 2010/0030754 A1 | 2/2010 | Petruzzo | |

OTHER PUBLICATIONS

Shieh, Johnny, "Quick Reference: AIX Logical Volume Manager and Veritas Volume Manger Oct. 2000," Nov. 30, 2000.

Backup Butler, White Paper, Database Appliances, Backup Butler 2 Terrabyte Backup Benchmark, Online, printed from http://web.archive.orgweb/20040406121507/ http://www.databaseappliances.com/pdf/competitionWHITEPAPER.pdf.

Microsoft TechNet, "SQL Server 2000 High Availability Series: Implementing Remote Mirroring and Stretch Clustering," printed Nov. 16, 2004.

* cited by examiner

DATA MIRRORING SYSTEM

This patent application is a divisional patent application of U.S. patent application Ser. No. 11/459,564, filed Jul. 24, 2006 and issued as U.S. Pat. No. 7,822,715 on Oct. 26, 2010, which is a continuation-in-part application of U.S. patent application Ser. No. 11/274,886, filed Nov. 16, 2005, which claims the benefit of U.S. Provisional Patent Application No. 60/627,971, filed Nov. 16, 2004, which are hereby incorporated by reference.

I. FIELD OF THE INVENTION

The present invention relates generally to safeguarding data, and more particularly to a system and method for mirroring and/or backing up data.

II. BACKGROUND OF THE INVENTION

It is almost axiomatic that a good computer data network should be able to still function if a catastrophic event such as the "crash" of a disk or a computer occurs. Thus, network administrators typically perform routine processes in which data is backed up to prevent its permanent loss if such an event were to occur. When such an event occurs, the backup version of the data can be introduced into the computer network and operation of the network can continue as normal. Although routine backup processes are typically effective in restoring data on the network to allow normal operation to continue, they often do not safeguard against the loss of all data. For instance, data that is introduced into the computer network at a time period shortly after a routine backup operation is completed is often permanently loss if a catastrophic event occurs before a subsequent backup operation.

In an effort to prevent such a type of loss, in addition to performing back up processes, network administrators often use a process known as mirroring. Such a process typically includes copying data from a first data storage location to at least one other data storage location in real time. If a catastrophic event such as a "disk crash" occurs, a failover operation can then be implemented to switch to a standby database or disk storage space, thereby preventing or acutely minimizing data loss. As the data is copied in real time, the data on the other data storage location is a substantial replica of the data residing on the first data storage location most of the time. Mirroring is often strongest when it is performed remotely. Although remote mirroring is ideal, it is sometimes not used because of its degradation on input/output performance of the network. For instance, transmission latency, for example, the time it takes to copy from the main storage device to the mirror, is often one of the greatest deterrents to remote data mirroring.

Data mirroring has a significant problem similar to that described above with respect to performing routine data backups. Data as part of an input/output (I/O) request introduced into the network prior to the mirroring processes is subject to permanent loss if the main storage device becomes inoperable, for example, crashes, while processing the I/O request that has not been sent to the mirror storage device. Such a result can be disastrous for a critical computer data network such as one utilized by an intelligence agency, a financial institution or network, a computer data medical network, or any other computer data network in which it is essential to prevent any loss of data.

In light of the foregoing, what is needed is a system and method for mirroring data, reducing data transmission latency, and preparing for data failover and/or synchronization.

III. SUMMARY OF THE INVENTION

In at least one exemplary embodiment, a system according to the invention includes a primary data storage space having a first non-volatile buffer and a secondary data storage space having a second non-volatile buffer in at least one exemplary embodiment wherein mirroring is performed to cause data stored on the secondary data storage space to replicate data stored on the primary data storage space and input/output requests affecting the primary data storage space are logged on at least the first non-volatile buffer to manage an event affecting data on the primary data storage space or data on the secondary data storage space.

In at least one exemplary embodiment, a method of the present invention includes logging a current data operation in a non-volatile buffer on a first device, executing the current data operation on the first device, transmitting the current data operation to a second device as the current data operation occurs on the first device, receiving a confirmation from the second device that the current data operation has been executed, and executing a subsequent data operation on the first device. The system and method of the invention can reduce latency and better prepare a network storage device for failover procedures.

In at least one exemplary embodiment, a method for mirroring data and preparing for failover, including logging a first data operation in a non-volatile buffer on a first device; executing the first data operation on the first device; transmitting the first data operation to a second device from the buffer on the first device; executing the first data operation on the second device; receiving a confirmation from the second device that the first data operation has been executed; logging a second data operation in the buffer on the first device; and executing a subsequent data operation on the first device.

In at least one exemplary embodiment, a system for providing fail-over for data storage includes a primary data storage unit including a buffer; a secondary data storage unit including a buffer; means for communicating between the primary data storage unit and the secondary data storage unit; and each buffer includes means for receiving a data operation and means for forwarding the data operation to at least one data storage unit.

In at least one exemplary embodiment, a system for providing failover protection for each data operation communication to the system, the system includes a first storage device having a non-volatile buffer; a second storage device; means for logging at least one data operation in the non-volatile buffer on the first storage device; means for executing the data operation on the first storage device; means for transmitting the data operation to the second storage device from the non-volatile buffer on the first storage device; means for executing the transmitted data operation on the second storage device; means for receiving a confirmation from the second storage device that the transmitted data operation has been executed.

In at least one exemplary embodiment, a method for mirroring data and preparing for failover, the method includes logging a first data operation in a buffer on a first storage unit; executing the first data operation on the first storage unit; transmitting the first data operation to a second storage unit from the buffer on the first device; executing the first data operation on the second storage unit; receiving a confirmation from the second storage unit that the first data operation has been executed; logging a second data operation in the buffer on the first storage unit; and executing a subsequent data operation on the first storage unit.

In at least one exemplary embodiment, a method for a first storage unit in a network having clients and a second storage unit, the method includes intercepting a data operation from a requesting client; determining whether the data operation modifies data present on the first storage unit; when no modification of data is required, retrieving the requested data based on the data operation, and transmitting the requested data to the requesting client; when modification of data is required, performing the data operation in the first storage unit, storing the data operation in a buffer, and transmitting the data operation to the second storage unit; receiving a confirmation from the second storage unit that data operation has been performed on the second storage unit; and deleting the data operation in the buffer in response to the confirmation for that data operation.

In at least one exemplary embodiment, a storage system including a first storage unit having intercepting means for intercepting data operations received by the first storage unit, and a storage array in communication with the intercepting means; a second storage unit having a storage array; a third storage unit having a storage array; and means for controlling the communication links between the first storage unit, the second storage unit, and the third storage unit such that the first storage unit and the second storage unit are set to be in communication during normal operations and the second storage unit and the third storage unit are in communication during a back-up period of time; and the intercepting means sends data operations performing a write to the second storage unit and the storage array of the first storage unit.

IV. BRIEF DESCRIPTION OF THE DRAWINGS

Like reference numerals in the figures represent and refer to the same element or function throughout.

V. DETAILED DESCRIPTION OF THE DRAWINGS

The present invention relates to protection of data to prevent data loss resulting from system failure. At least one exemplary system also logs data input/output requests to prepare for failover and improve the integrity of the mirroring process. When one storage unit has a failure and becomes unusable, by switching the IP address or the DNS entry, the secondary storage unit can take the place of the primary storage unit (or a replacement storage unit or back-up storage unit can take the place of the secondary storage unit).

Figure 1:
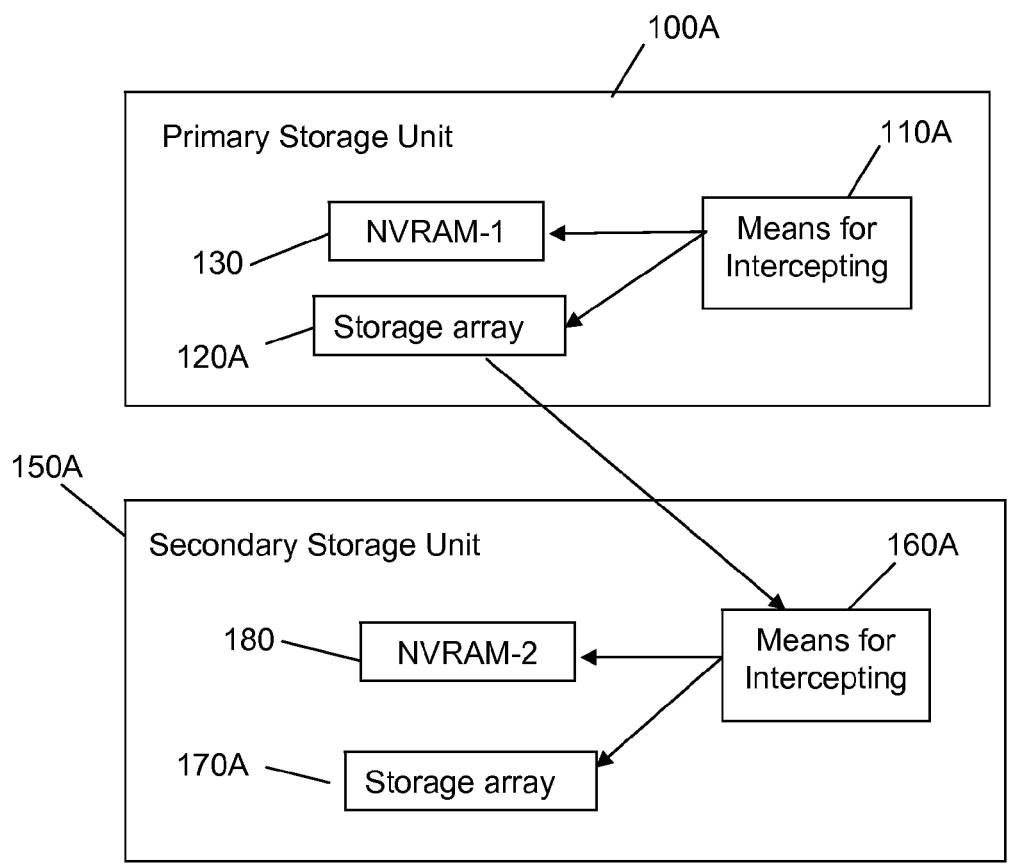
FIG. 1 illustrates an exemplary mirroring system according to at least one exemplary embodiment of the present invention.
Figure 4:
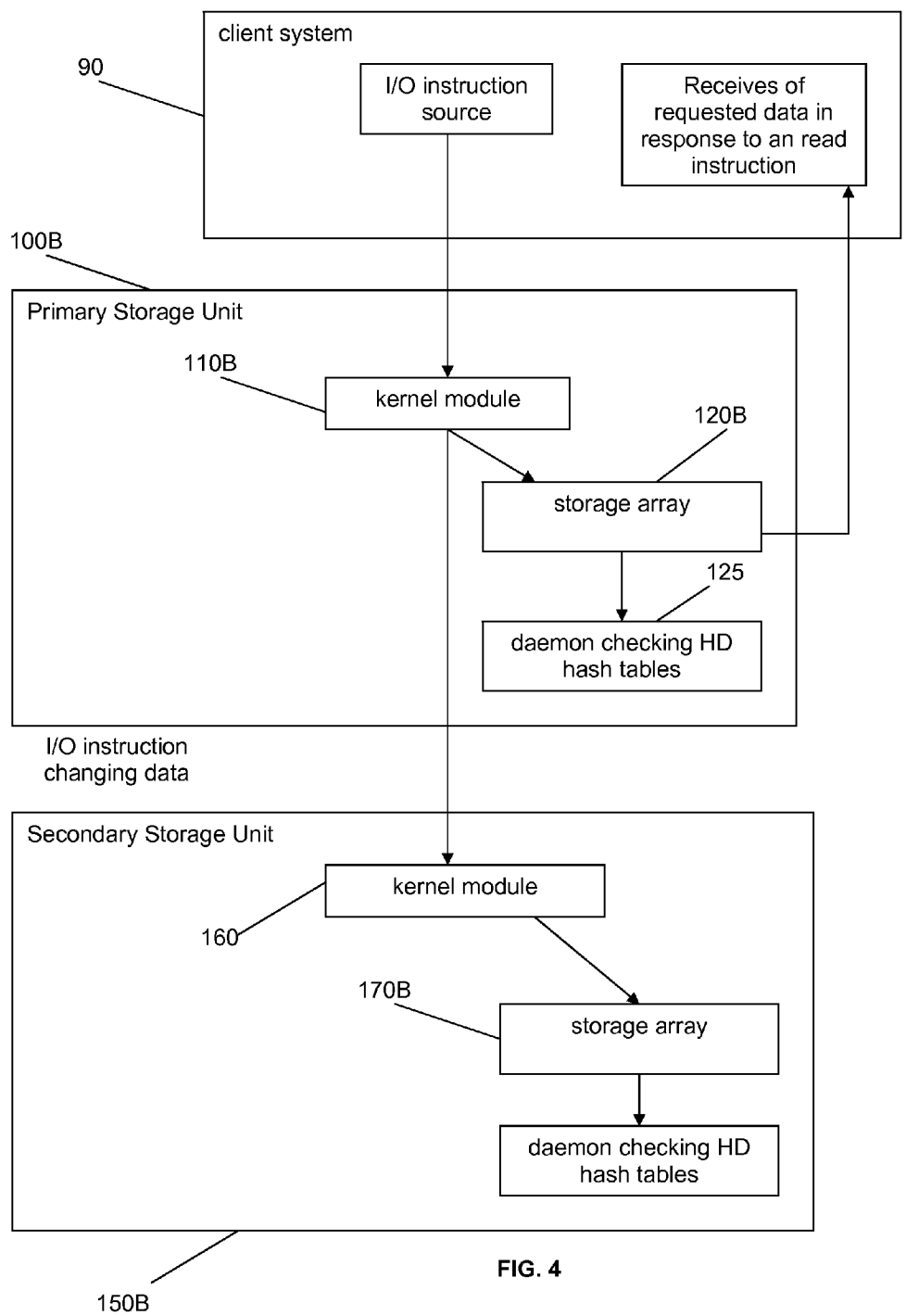
FIG. 4 depicts an exemplary mirroring system according to at least one exemplary embodiment of the present invention.

FIGS. 1 and 4 illustrate exemplary embodiments having a mirroring system 100 that includes a primary storage unit 100 and a secondary storage unit 150. For example, in at least one exemplary embodiment, each of the storage units includes a storage array 120, 170 such as a set of multiple hard drives in a RAID arrangement. Two exemplary configurations are twelve 160 gigabyte hard drives are arranged to provide 1 terabyte of storage or sixteen 500 gigabyte hard drives for 1.4 terabyte of storage while using the highest performance portion of each hard drive in the array to improve access times. The arrangement, the number, the percentage used, and the size of the hard drives used for a storage array can vary depending upon the storage requirements of the system. In addition, there may be multiple storage units pooled together to form larger storage systems. Additionally, the entire hard drive may be used instead of the highest performance portion.

Each of the storage units illustrated in FIG. 1 includes a buffer storage space. For example, the illustrated primary storage unit (or first device) 100A includes a non-volatile random access memory (NVRAM) 130 as the buffer, but other types of buffer storage may be used including memory and non-volatile memory. Likewise, the illustrated secondary storage unit (or second device) 150A includes a NVRAM 180, which may be omitted but if omitted then the secondary storage unit will not be able to fully replace the primary storage unit. The NVRAM 130 and the NVRAM 180 in the discussed exemplary embodiments preferably have the same capabilities unless noted otherwise. In at least one embodiment, the NVRAM is included on a memory card such as an eight gigabyte PC3200 DDR REG ECC (8×1 gigabyte) random access memory card.

In at least one embodiment, the storage units 100A, 150A include an emergency reboot capability. In such an embodiment, the NVRAM 130 resides on a card with its own processor so that if the primary storage unit 100A crashes and is unable to recover, the NVRAM 130 is able to transmit the last few instructions relating to, for example, writing, deleting, copying, or moving data within the storage unit to the secondary storage unit 150A. In at least one embodiment in which the storage unit 100A, 150A includes an emergency reboot capability, the card includes a power source to supply power to the card to complete the transmission of the last few instructions. Either of the last two embodiments can be thought of as an emergency reboot capability.

For purposes of explanation, primary means for intercepting 110A and secondary means for intercepting 160A are also illustrated in FIG. 1. For example, in at least one embodiment, primary intercepting means 110A and secondary intercepting means 160A are each software, for example, computer program or kernel modules, resident in their respective units for intercepting I/O request(s) and logging the I/O request(s) in the NVRAM before (or simultaneously with) the I/O request(s) are executed by the storage unit. The flow of instructions between the primary storage unit 100A and the secondary storage unit 150A including their respective buffer storage spaces will be explained in more detail with respect to FIG. 3.

Figure 2:
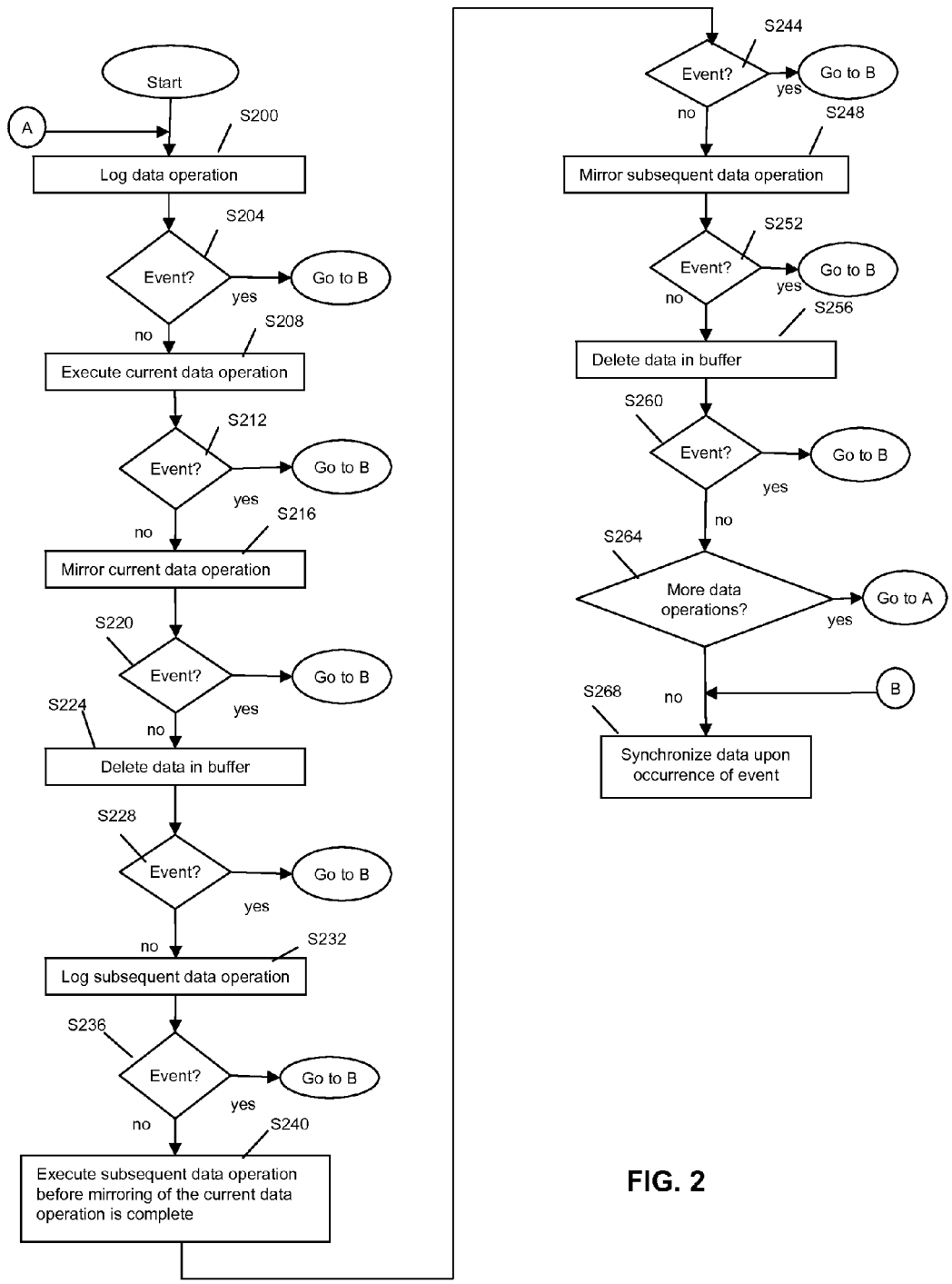
FIG. 2 is a flow diagram illustrating an exemplary method for mirroring employed by the system of FIG. 1 according to at least one exemplary embodiment of the present invention.

Referring now to FIGS. 1 and 2, in step S200 of FIG. 2, at least one data operation such as a data input/output request is logged in the NVRAM-1 130. In decision step S204, if it is determined whether an event has occurred, and if an event has occurred then step S268 is executed. Examples of an event that would cause synchronization in this exemplary embodiment include, for example, the buffer 130 filling up (or reaching a predetermined limit), the primary storage unit 100A crashing or having other hardwire issues, and the communication link with the secondary storage unit 150A is restored after a communication failure. In at least one exemplary embodiment, synchronization automatically occurs after a request for a file synchronization and/or a request from a database to commit a transaction. In step S268, all data is synchronized between the two storage units. In other words, the primary storage unit 100A is synchronized with the secondary storage unit 150A. In the illustrated embodiment, synchronization occurs during specified events as opposed to frequent predetermined time intervals; however, synchronization could occur at predetermined time intervals. The event determination steps may be omitted and replaced by an interrupt that will stop the process when an event is determined to have occurred.

In step S208, the data operation is executed. In at least one exemplary embodiment, only data operations that change stored data are sent to the secondary storage unit 150A. For example, a data write operation may be executed to write a new block of data to the storage array 120A of the primary storage unit 100A and this type of operation will also occur on the storage array 170A of the secondary storage unit 150A. As illustrated in FIG. 2, after each step, it is determined whether an event has occurred that requires the storage units to be synchronized. For example, in at least one exemplary embodiment, the storage units are randomly synchronized. It should be noted that the storage units are also preferably synchronized upon bringing one of the storage units on-line, for example, after a secondary storage unit is brought on-line. In at least one exemplary embodiment, the determination as to whether the above-referenced event has occurred is determined by whether the communication link of one or both of the storage units has been interrupted (or disrupted).

In decision step S212, if it is determined that an event has occurred, and then step S268 is executed.

In step S216, the data operation that was executed in step S208 is executed on the storage array 170A of the secondary storage unit 150A. After a determination is made as to whether an event has occurred in step S220, in step S224, data relating to the data operation is erased from the buffers in both primary and secondary storage units, for example, by having the secondary storage unit 150A notify the primary storage unit 100A of completion of the data operation. Steps S208 and S216 may be performed in reverse order to that illustrated in FIG. 2 or simultaneously. Step S224 may occur prior to step S208 or simultaneously with step S208. In step S228, it is determined whether an event has occurred.

In step S232, a subsequent data operation is logged in the buffer to prepare for a fail over. In decision step S236, it is determined whether an event has occurred.

In step S240, in at least one exemplary embodiment, a subsequent data operation is executed before mirroring of the data operation executed in step S216 has completed. Executing the subsequent data operation before the previous data operation has been completed on the secondary storage unit 150A can reduce latency during the mirroring process, as data operations on the primary storage unit 100A can continue without being delayed due to waiting on the data operation on the secondary storage unit 150A to be completed. Since the data operation is stored in a buffer 130, the data operation will be available for transmission to the secondary storage unit 150A. In at least one embodiment, the subsequent data operation is not executed on the primary storage unit 100A until after the mirroring of the current data operation has occurred. In such a situation, after the current data operation has been completed on the primary storage unit 100A, completion is not signaled to the process sending the I/O instruction on the primary storage unit 100A until after the current data operation has been completed on the secondary storage unit 150A.

In decision step S244, it is determined whether an event has occurred. In step S248, the subsequent data operation is mirrored. In decision step S252, it is determined whether an event has occurred.

In step S256, data relating to the data operation is removed (or erased) from buffers in both the primary storage unit 100A and the secondary storage unit 150A upon performance of the data operation by the secondary storage unit 150A. In step S260, a determination is made regarding whether an event has occurred. If it is determined in step S264 that there are more data operations, steps S200-S260 are repeated. Alternatively, if it is determined that there are no more data operations to be processed, in step S268, in at least one exemplary embodiment, the data is synchronize upon occurrence of an event such as one of the events described above. Alternatively, the system waits for the next data operation. Another exemplary embodiment eliminates one or more of event decision steps from the illustrated method of FIG. 2.

Figure 3:
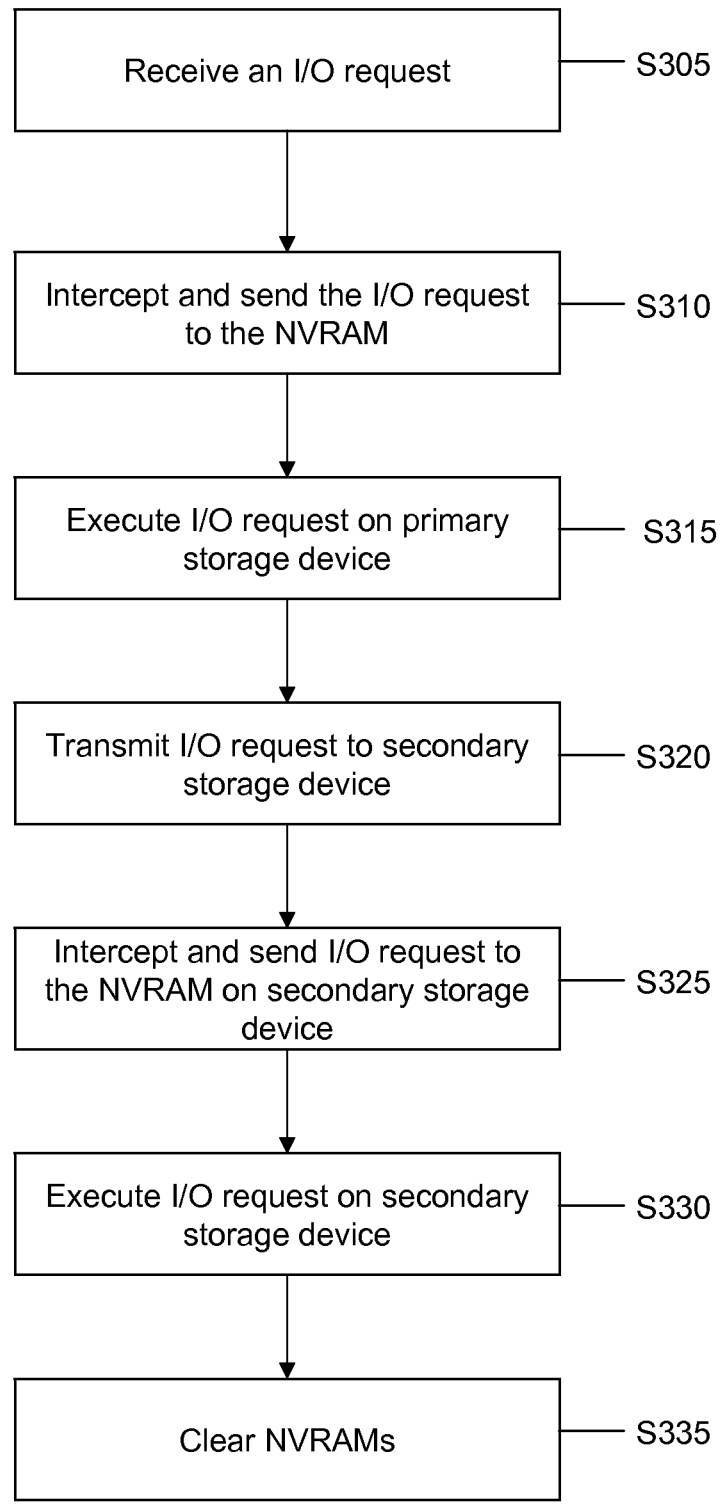
FIG. 3 is a flow diagram illustrating an exemplary method for processing input/output requests according to at least one exemplary embodiment of the present invention.

Referring now to FIG. 3, in step S305, an I/O request is received as the data operation at the primary storage unit 100A. For example, in at least one embodiment, a data write operation is received that includes data to be written and a particular block address where the data is to be written within the storage array 120A of the primary storage unit 100A.

In step S310, the I/O request received in step S305 is intercepted by the intercepting means 110A and transmitted to (or logged in) the NVRAM-1 130, in preparation for a fail-over situation. In particular, if the primary storage unit 100A should experience a disk crash before the I/O request can be processed, when the repaired primary storage unit 100A or its replacement storage unit (such as the secondary storage unit 150A) enters an on-line state, the I/O request can be transmitted from the NVRAM-1 130 and executed, thereby minimizing restoration time.

In at least one exemplary embodiment, at least one data block pointer to the data block associated with an instruction, for example, is written to the NVRAM-1 130. For example, continuing with the write operation offered above, in step S310, a pointer to the actual data block that is to be written to the primary storage unit 100A is sent to the NVRAM-1 130. If a mishap such as a crash of the secondary storage unit 150A were to occur before the data is actually written to the secondary storage unit 150A, the copy of the data in the NVRAM-1 130 can be accessed and written to the mirror storage unit replacement. In at least one exemplary embodiment, the actual data to be written is stored in the NVRAM-1 130.

In addition to handling a failover situation in which the secondary storage unit 150A crashes, the present invention includes an exemplary embodiment that handles a failover situation in which the primary storage unit 100A crashes. In particular, in at least one exemplary embodiment, data associated with an instruction is stored in the NVRAM-1 130. For example, continuing with the example offered above, in step S310, the actual data block that is to be written to the primary storage unit 100A is written to the NVRAM-1 130. In such a situation, if the primary storage unit 100A were to experience a disk crash, thereby rendering its data inaccessible, the data can be copied from the NVRAM-1 130 to the primary storage unit replacement and ultimately to the secondary storage unit (or its replacement) 150A, which likely would be the primary storage unit replacement. In particular, in at least one embodiment, a central processing unit (CPU) on the primary storage unit 100A reboots with an emergency operating system kernel which is responsible for accessing the NVRAM-1 130 and performs data synchronization with secondary storage unit 150A. The NVRAM logged data and the block pointers, for example, stored therein can be used to replay the mirror block updates and then the input/output requests that were "in flight" when the primary storage unit 100A failed. The secondary storage unit 150A or another storage unit can then transparently take over input/output requests. In at least one exemplary embodiment, the processing card on which the NVRAM-1 130 is stored includes its own CPU which can perform a synchronization regardless of whether the primary storage unit 100A is operable.

In step S315, the I/O request is executed on the primary storage unit 100A. For example, the data is written to a block address within the storage array 120A of the primary storage unit 100A.

It should be noted that the order of steps illustrated in FIG. 3 represents a sequence of steps performed in an exemplary embodiment, and as such the order of steps may vary. For example, in at least one exemplary embodiment, step S315 occurs before step S310. Alternatively, in at least one exemplary embodiment, the steps S310 and S315 occur simultaneously.

In step S320, the instruction received in the NVRAM-1 130 is transmitted from the NVRAM-1 130 to the secondary storage unit 150A and/or the means for intercepting 160A. In at least one embodiment, the instruction is transmitted from the NVRAM-1 130 to the NVRAM-2 180. It should be noted that step S320 may not occur at the exact sequence point as illustrated in FIG. 3. For example, in at least one embodiment, step S320 may occur at the same time as or before step S310 and/or step S315.

In step S325, the I/O request is transmitted from the intercepting means 110A to the NVRAM-2 180 in preparation for failover. In particular, if the primary storage unit 100A should experience a disk crash, for example, the secondary storage unit 150A can serve as the primary storage unit. In at least one embodiment, a synchronization is performed before the primary storage unit 100A experiences a disk crash to bring the secondary storage unit 150A up-to-date compared to the primary storage unit 100A. When the primary storage unit 100A experiences a disk crash, a function of the secondary storage unit 150A will require replacement by a new secondary storage unit, which is preferably added to the system to serve the function of the secondary storage unit 150A. Logging to the NVRAMs preferably continues after the replacement with the secondary storage unit 150A serving as the primary storage unit. When the original secondary storage unit 150A receives an I/O request, the I/O request will be transmitted to an NVRAM on the original secondary storage unit 150A and then ultimately transmitted to an NVRAM on the new secondary storage unit. In at least one embodiment, the primary storage unit 100A is rebuilt from the secondary storage unit 150A. After the primary storage unit 100A is rebuilt, I/O operations on the primary storage unit 100A are performed.

It should be noted that the primary storage unit 100A may crash before a synchronization is possible. In such an instance, the primary storage unit 100A preferably reboots with an emergency kernel whose job includes accessing the NVRAM-1 130 and performing a synchronization and/or transmission of any pending data operations. In at least one exemplary embodiment, as discussed earlier, the NVRAM-1 130 includes its own processor which performs synchronization and/or transmission of any pending data operations even when the primary storage unit 100A is inoperable, for example, when a disk crash is experienced.

Failover preparation also occurs when the secondary storage unit 150A or the network to the secondary storage unit 150A should experience a disk crash, mirror block pointers preferably remain in the NVRAM-1 130, for example, as the asynchronous mirror input/output has not been completed. When the secondary storage unit 150A is again available, data blocks from the primary storage unit 100A identified by the NVRAM pointer(s) are preferably asynchronously copied over to the secondary storage unit 150A.

In step S330, the I/O request is executed on the secondary storage unit 150A.

In step S335, the NVRAM-1 130 is cleared. For example, in step S335, after all data operations are allowed to complete, the data logged in NVRAM-1 130 is flushed or cleared. An exemplary method of accomplishing this is for the secondary storage unit 150A to send a signal to the NVRAM-1 130 confirming the I/O request has been performed. It should be noted, however, that the NVRAM-1 130 may also be cleared at other times. In particular, in at least one exemplary embodiment, synchronization automatically occurs when the NVRAM-1 130 is full. In at least one exemplary embodiment, synchronization automatically occurs with a third storage unit in communication with the secondary storage unit when the NVRAM-2 180 is full. In an embodiment where there is not a third (or backup) storage unit in communication with the secondary storage unit 150A, then the completed data operation is cleared form the NVRAM-2 180. Alternatively, the buffers could delete on a first-in-first-delete basis.

It should be noted that the present invention can be utilized in conjunction with other utilities. For instance, Linux, such as Suse Linux, Knoppix Linux, Red Hat Linux, or Debian Linux high availability clustering, mirroring and fail-over capabilities can be utilized by the present invention in conjunction with the NVRAM data logging feature and the emergency reboot capability mentioned above. Such mirroring and fail-over facilities can work with networking input/output protocols used by storage devices, for example, Unix/Linux clients, SMB for Microsoft® Windows clients, and Internet Small Computer Systems Interface (ISCSI).

FIG. 4 illustrates an exemplary embodiment where a kernel module handles the processing and instruction intercept for the storage units 100B, 150B. The primary storage unit 100B as illustrated includes a kernel module (or means for intercepting) 110B, a storage array 120B, and a hash table daemon 125. The hash table daemon 125 instead may be a module or other type of controller.

Figure 5:
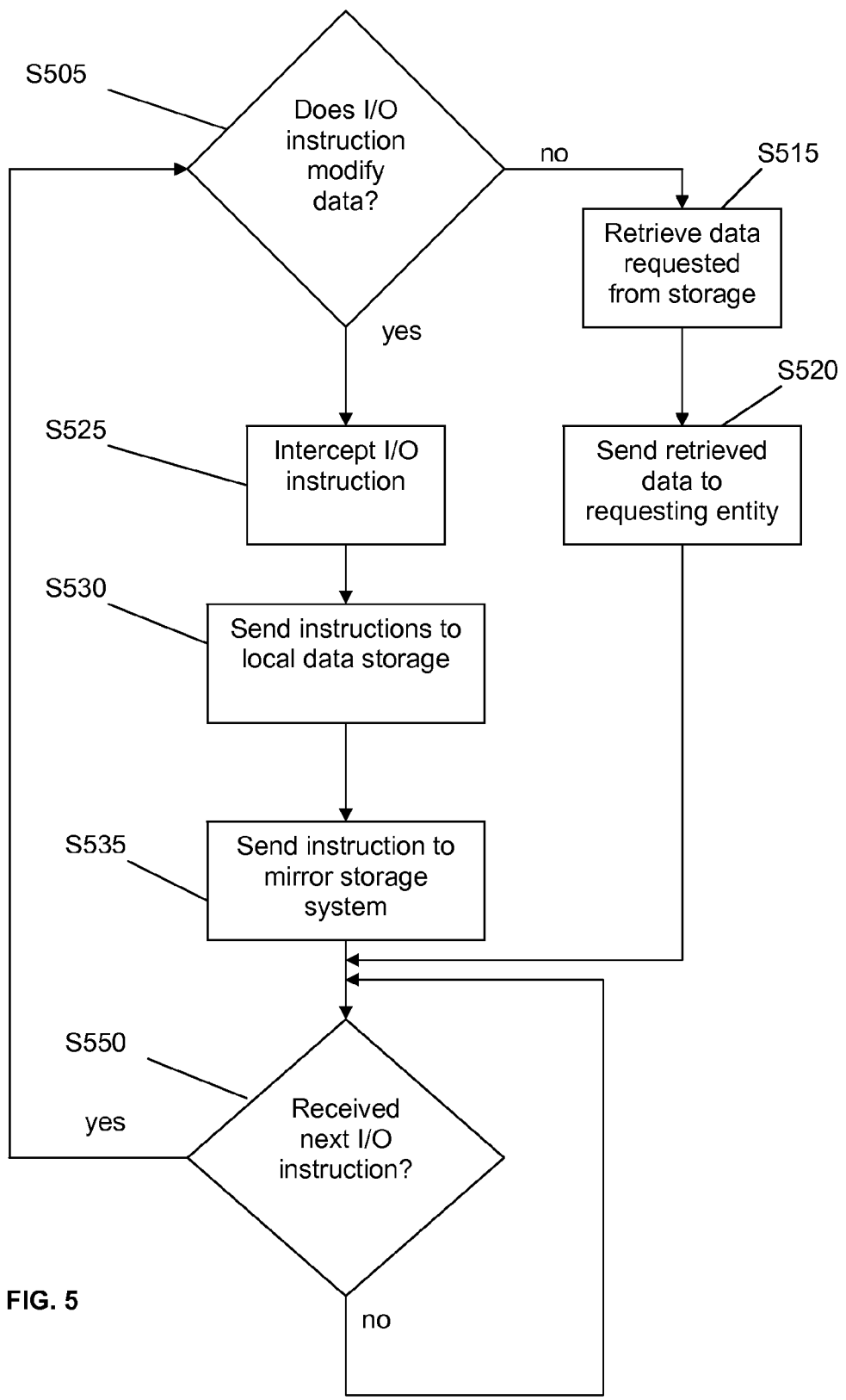
FIG. 5 is a flow diagram illustrating an exemplary method for processing I/O requests according to at least one exemplary embodiment of the present invention.
Figure 6:
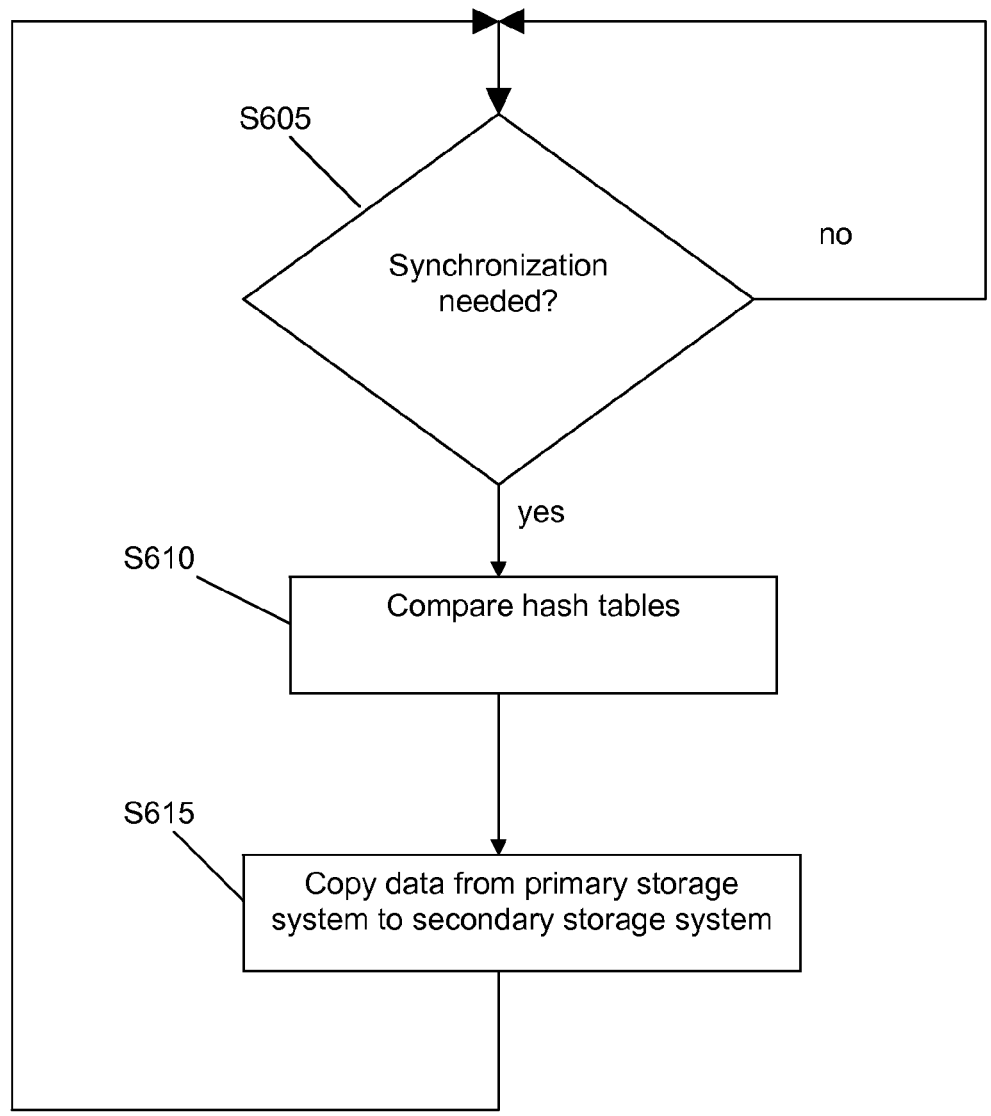
FIG. 6 is a flow diagram illustrating an exemplary method for synchronizing according to at least one exemplary embodiment of the present invention.

As illustrated in FIG. 5, when an I/O instruction is received by the primary storage unit 100B from a client system 90, the kernel module 110B determines whether the I/O instruction is for modifying data contained in the storage array 120B, step S505. If the I/O instruction is for retrieving data, the kernel module 110B retrieves the data from the storage array 120B, step S515, and sends the retrieved information to the requesting entity, step S520. If the I/O instruction is for writing data to or otherwise modifying data on the storage array 120B, then the kernel module 110B intercepts the I/O instruction, step S525. The kernel module 110B sends the I/O instruction to the storage array 120B, step S530, and sends the I/O instruction to the secondary storage unit 150B, step S535. The steps S530 and S535 can also occur in reverse order or simultaneous instead of the illustrated order in FIG. 5. The kernel module 110B waits for the next I/O instruction, step S550. The secondary storage unit 150B in at least one exemplary embodiment is also able to perform the exemplary method in FIG. 5. In an implementation where there is no further downstream storage unit attached to the secondary storage unit 150B, then step S535 is omitted as not being needed, for example, by a setting on the secondary storage unit, although if performed would not have a large impact on the operation of the secondary storage unit 150B and may allow for an easier swap of the secondary storage unit 150B for the primary storage unit 100B. By having a similar structure between the primary and secondary storage units, the storage units are interchangeable.

The storage array 120B illustrated in FIG. 4 includes a plurality of hard drives, which in combination provide the storage requirements desired for a particular implementation. An exemplary implementation for the storage array 120B is an arrangement of sixteen 160 gigabyte hard drives with fourteen hard drives used for storage and two hard drives used for storing the operating system for the system and the location in particular implementations of a buffer for I/O instructions. This arrangement when using the fastest portion of each hard drive provides a storage capacity of approximately 1.4 terabyte for the storage unit. The fastest portion of a hard drive includes the sectors on the inner tracks of each platter surface. This type of arrangement also allows for the slower portion of each of the hard drives to be used for providing a in-storage unit mirror of the data by providing a mirror location such that, for example, a working data block on hard drive number 1 is mirrored on the backup portion of hard drive number 2 (or another hard drive other than number 1). To provide additional redundancy the data stored in the working data areas is stored using a cascade RAID 5 across the fourteen storage hard drives, which will provide two parity bits for each stripe of data. A second exemplary configuration has sixteen 500 gigabyte hard drives in an array to form an 8.0 terabyte storage capacity, which would require using the entire drive for storage. Depending upon the size of hard drive used and the number of hard drives, a wide range of modular storage capacities are possible including the situation where the entire hard drive is used as primary storage when speed and performance is less of (or not) an issue for the user.

An exemplary configuration for the Ethernet cards is a set of four 1 gigabyte Ethernet cards to allow for two input connections and two output connections or alternatively a dedicated set depending upon the operation occurring (i.e., connection to the primary storage unit as opposed to the backup storage unit). Another exemplary configuration is a set of ten 1 gigabyte Ethernet cards to allow for routing of communication links through different networks to provide redundancy in the connections for each storage unit.

In the exemplary embodiment illustrated in FIG. 4, when there is a need for synchronization between the primary storage unit 100B and the secondary storage unit 150B, step S605, the hash table daemon 125 performs a comparison of the hash table(s) for the storage array 1208 with the storage array 1708 to see where differences exist, step S610. When a difference exists, copying the relevant data from the storage array 120B to the storage array 170B, step S615. The hash table daemon 125 waits for the next synchronization, S605. Alternatively, the hash table daemon 125 may continually compare hash tables instead of waiting for a synchronization request or event to occur. The hash table daemon 125 can also be used in at least one exemplary embodiment to bring a backup storage unit current when it takes the place of a secondary storage unit 150B.

Figure 7:
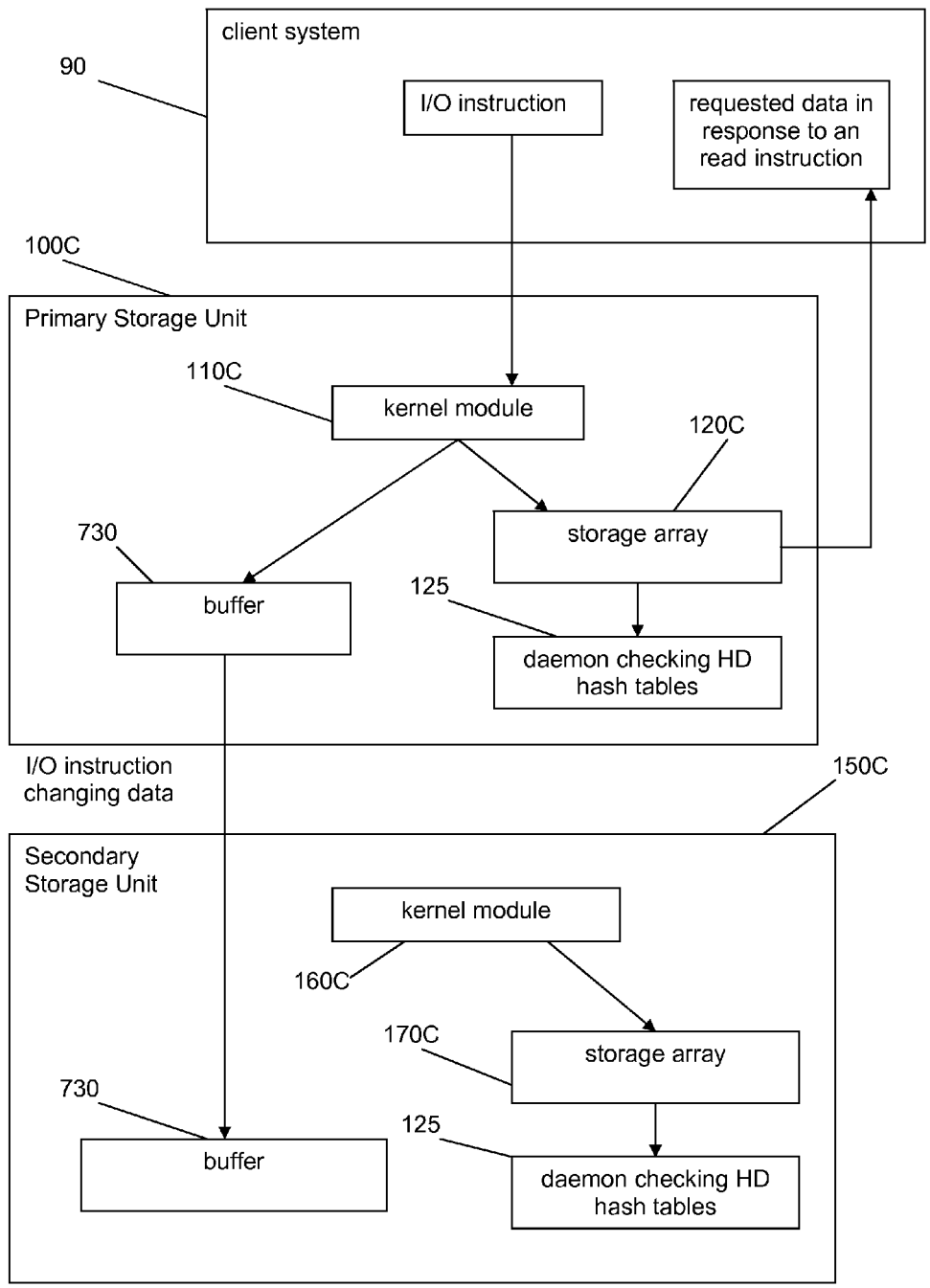
FIG. 7 illustrates an exemplary mirroring system according to at least one exemplary embodiment of the present invention.

FIG. 7 illustrates a system similar to the system illustrated in FIG. 5 with the addition of a buffer 730 being present in the storage units 100C, 150C. The buffer 730 is present in the communication path between the kernel module 120B and the secondary storage unit 150C. Although not illustrated, the buffer may be present in a parallel path to the communication link between the kernel module 120B and the secondary storage unit 150C. The buffer 730 in the illustrated exemplary embodiment provides a place to hold I/O instructions that modify the contents of the storage array particularly if the link with the secondary storage unit 150C is broken thus providing a queue. The buffer 730 in at least one exemplary embodiment retains the I/O instruction until a confirmation is received from the secondary storage unit 150C that the I/O instruction has been performed. The buffer 730 in at least one exemplary embodiment includes the NVRAM discussed above. Alternatively, the buffer 730 may retain the I/O instruction until it has been transmitted by the primary storage unit to the secondary storage unit, and upon transmission deleting the I/O instruction. The presence of the buffer 730 allows for storage of I/O instructions during the period of disconnection of the secondary storage unit 150C and transmission of these stored I/O instructions once reconnection has occurred.

Figure 8:
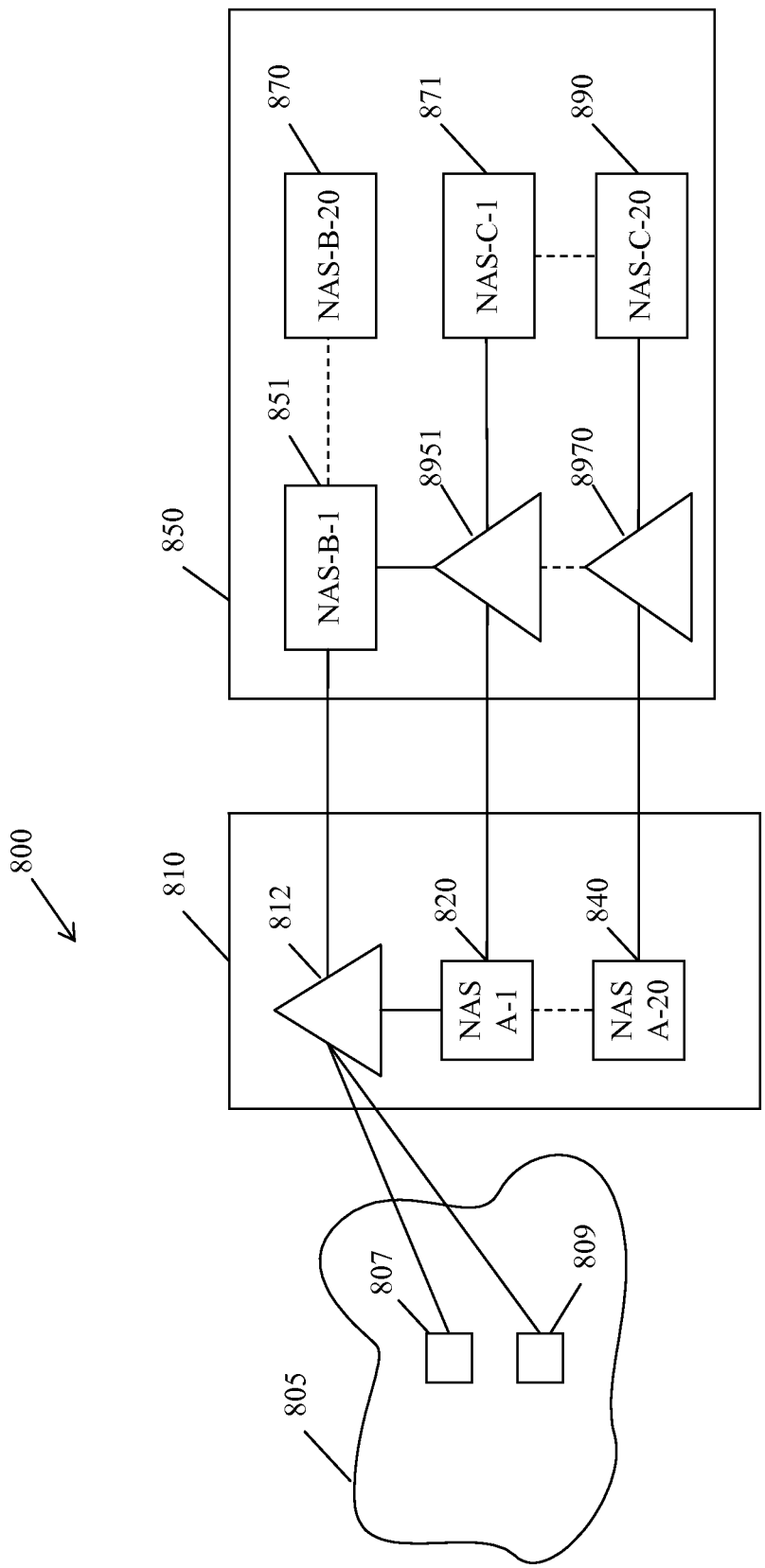
FIG. 8 depicts an exemplary configuration according to at least one embodiment of the present invention.

FIG. 8 illustrates a system 800 that includes a distributed twenty terabyte Network Attached Storage (NAS) configuration in which the at least one exemplary embodiment can be utilized. To improve the level of security in the NAS configuration (locations 810 and 850), the network connections within the NAS configuration can be through a private network that is connected to the outside world through a gateway or similar device to allow for access to the stored data. After being presented with the disclosure herein, one of ordinary skill in the relevant art will appreciate that although twenty storage units (or devices) are illustrated in FIG. 8, any viable number of storage device sets can be used, for example, one or more of the storage devices.

Network File System (NFS) can provide UNIX client file connectivity, and SAMBA can provide Microsoft Windows client connectivity. The XFS file system can provide a solid, scalable journaling file system. The Logical Volume Manager (LVM) can be utilized to administer the large volumes of data and provide "snapshot" capability which can allow backups to be conducted without stopping primary I/O operations. The Enhanced Network Block Device (ENBD) can allow remote mirroring to be accomplished, as it can cause a remote filesystem to appear as a local disk so the remote file system can be specified as a mirror in a standard Linux RAID 1 setup. ENBD can also perform other functions which can cause remote mirroring to be practical. For example, RAID 1 can automatically be rebuilt in an entire mirror when a "bad disk" has to be replaced. ENBD is "intelligent" enough to know that after a bad disk condition is created by network service interruption, the mirror can be incrementally rebuilt with just those disk blocks changed during the network interruption.

Domain Name Service (DNS), the standard Internet Protocol (IP) dynamic name service, can enable UNIX and Windows clients to locate remote NAS file resources. Using DNS round robin IP assignment, I/O work load balancing can be achieved between the primary and mirror NAS machines, in such a case, both NAS machines should serve as primaries and would serve as mirrors for the other NAS machine, i.e., when one machine receives a data operation manipulating data it will transmit the data operation to the second machine. It should be noted that a code change to the root DNS server can be performed so that it only assigns an IP address if a particular machine is operable.

In the example shown in FIG. 8, a distributed 20 terabyte configuration is shown that includes Unix and Microsoft Windows client machines in the "outside world" 805. A large gigabit switch 812 in addition to twenty NAS-A primary storage units, for example, NAS-A-1 821 through NAS-A-20 840, are located in a first building 810, as illustrated in FIG. 8. As illustrated in FIG. 8, a second building 850 includes twenty NAS-B secondary storage units, for example, NAS-B-1 851 through NAS-B-20 870, twenty NAS-C backup storage units, for example, NAS-C-1 871 through NAS-C-20 890, and twenty smaller switches, for example, switch 8951 through switch 8970 located in, for example, racks in the second building 850. It should be noted that the configuration depicted in FIG. 8 requires a bundle of approximately eighty cables (or equivalent bandwidth) connecting the first building 810 to the second building 850. But this is very reasonable since it enables the real-time mirroring of a twenty terabyte setup, and a full twenty terabyte backup of the entire configuration in less than one hour.

The primary unit NAS-A-1 821 in FIG. 8 and the secondary storage unit NAS-B-1 851, are preferably both configured with four one gigabit Network Information Cards (NICs), two of which preferably plug into a gigabit switch 812, which preferably connects the storage units to the "outside world" having, for example, at least one group 807 of Microsoft Windows clients and at least one group 809 of Unix clients although different client types could be present instead. The other two NICs of each storage unit are preferably plugged into a small, 8-port gigabit switch 8951, which is connected to the backup storage unit NAS-C-1 871. Each NAS-C storage unit in this exemplary embodiment includes 4 NICS, and each of the 4 NICS connects to a small gigabit switch. For example, NAS-C-20 890 includes 4 NICS that connect to the small, 8-port gigabit switch 8970, as shown in FIG. 8. Alternatively, each NAS storage unit may include between two and sixteen gigabit Ethernet cards, and more particularly ten gigabit Ethernet cards to improve throughput. In at least one embodiment, each NAS storage unit preferably includes at least twelve 120 gigabyte hard drives attached together using a hardware RAID, for example set up as a RAID 5 configuration. As discussed above in connection with at least one exemplary embodiment, each NAS storage unit includes sixteen 120 gigabyte hard drives with fourteen hard drives providing storage and two hard drives to provide approximately 1.4 terabytes of storage.

Good throughput is experienced by the system, as both NAS-A and NAS-B storage units are used as DNS load balanced primaries in the illustrated embodiment of FIG. 8. Thus, approximately half the workload was being accomplished by each machine. This is preferably ideal as read activity is usually higher than update activity requiring mirroring. In situations of high update activity, it is probably best to configure the NAS-B storage units as dedicated to mirroring and fail-over.

An exemplary way to recover a file (when needed) from a NAS-C backup storage unit, the required NAS-C file system is mounted, and "DD copy" is used to copy the required file. In cases where client machines (that is, in cases which other machines in addition to the NASs) required connectivity to NAS backup storage units, corresponding NAS-A and NAS-B storage units provided needed IP forwarding, as NAS-C storage units did not have a direct connection to the big gigabyte switch 812 shown in FIG. 8.

Figure 9:
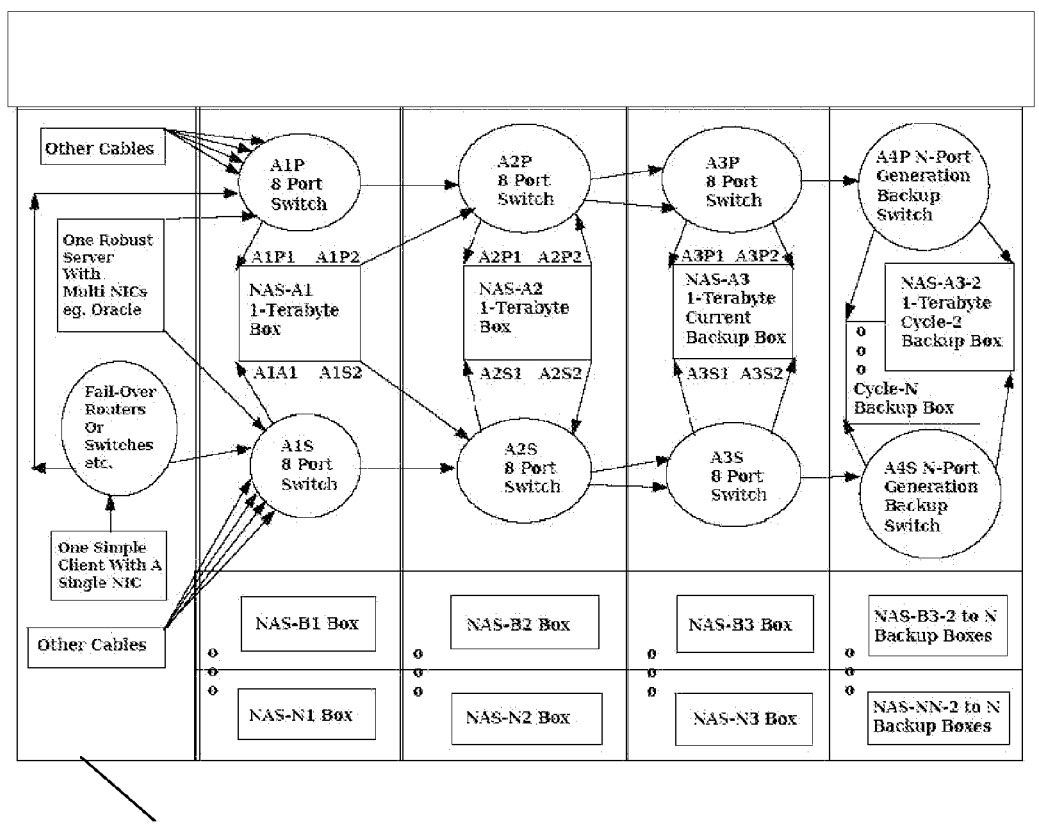
FIG. 9 illustrates an exemplary configuration according to at least one embodiment of the present invention.

FIG. 9 illustrates an exemplary implementation of the invention. The client and server side of the network being located in the outside world 905 and connected to the data storage through a plurality of switches, which in the illustrated embodiment of FIG. 9 are 8 port switches, that have two levels of redundancy between A1P, A2P, A3P, A4P to the ANP switches and MS, A2S, A3S, A4S to the ANS switches for each level of terabyte NAS storage units. Each illustrated set of terabyte NAS storage units includes a primary storage unit NAS-A1, a secondary storage unit NAS-A2, a current backup storage unit NAS-A3, and at least one prior generation backup storage unit NAS-A3-2 through NAS-A3-N. As illustrated in FIG. 9, the system may be expanded for multiple terabyte storage from NAS-B to NAS-N each with there respective set of switches (not illustrated). In an ideal environment, the primary storage units would be located in one building, the secondary storage units would be located in a second building, the current backup storage units would be located in a third building, and each additional set of backup storage units would be located in their own building. A compromise arrangement would have the primary storage units in building one and the remaining units located in building two similar to the arrangement illustrated in FIG. 8. However, a variety of combinations would be possible including having all the storage units in one building.

Backups for the systems illustrated in FIGS. 8 and 9 were executed smoothly without interruption. The back-up methodology illustrated in FIG. 10 allows the primary storage unit to continue to operate with no performance depreciation (or little impact on performance) during a back-up routine when the back-up is taken from the secondary storage unit. Alternatively, when load balancing is used between a primary storage unit and a secondary storage unit the methodology will still work. The performance impact is minimal on both units because the data present on the storage units is copied as it resides irrespective of the file system used to store the data. Using the exemplary system 800, for example, a back-up of a terabyte of data can occur in one hour or less due to the throughput that exists in the exemplary system 800 as described above in connection with FIG. 8. The data is copied irrespective of the file system used to store the data. Additionally, since each terabyte or more of data operates as a self-contained backup, additional set of data are backed up in parallel thereby enabling many multi-terabyte configurations to be backed up in a total time of under one hour.

The testing of the system 800 illustrated in FIG. 8 included quiescing databases (for example, Oracle and DB2), quiescing the XFS file systems, taking logical LVM file system snapshots, and resuming the XFS file systems and databases. After this procedure, the NAS-A primary storage units and NAS-B secondary storage unit snapshots were "DD copied" to the NAS-C backup (or third) storage units, with the first six disk snapshots being transmitted from the NAS-A primary storage units, and the second six disk snapshots coming from the NAS-B secondary storage units. Finally, the snapshots were "LVM deleted." The above described backup procedure was accomplished in approximately one hour, with no interruption of ongoing work, with the exception of a pause to quiesce and snapshot.

Figure 10:
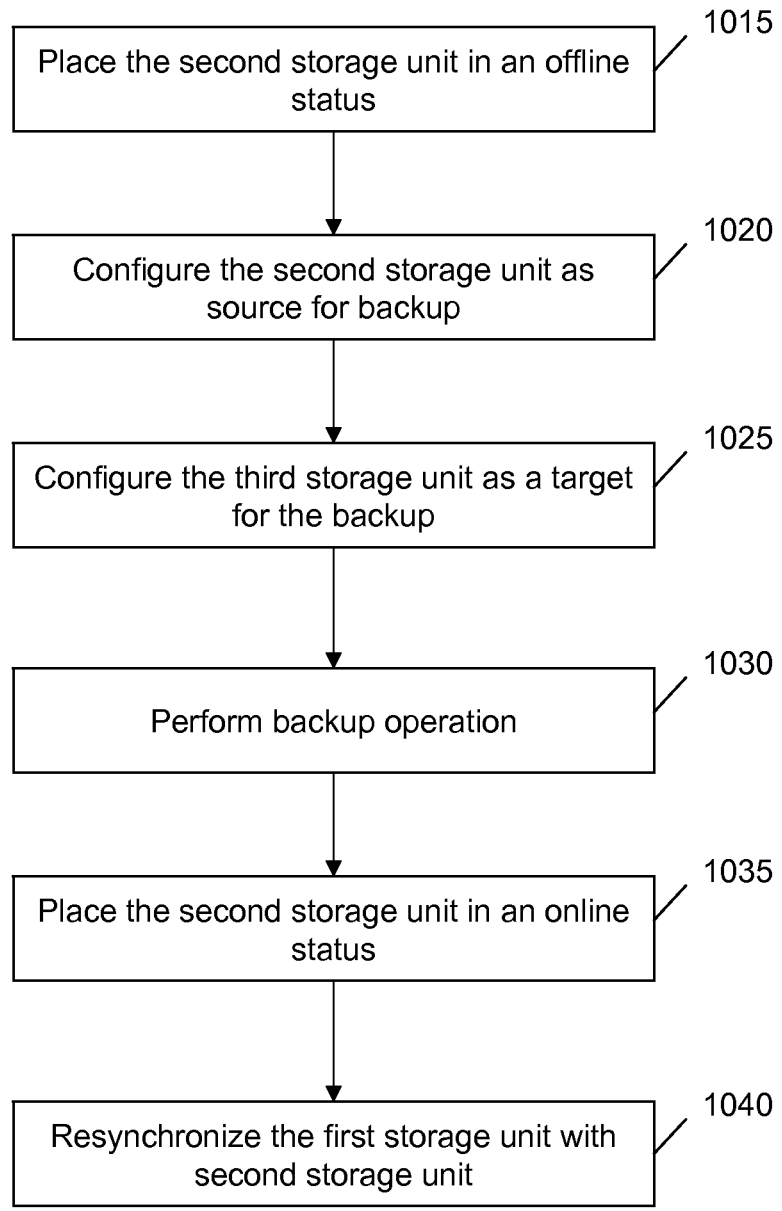
FIG. 10 is a flow diagram illustrating an exemplary method for performing a backup operation in at least one exemplary embodiment of the present invention.
Figure 11:
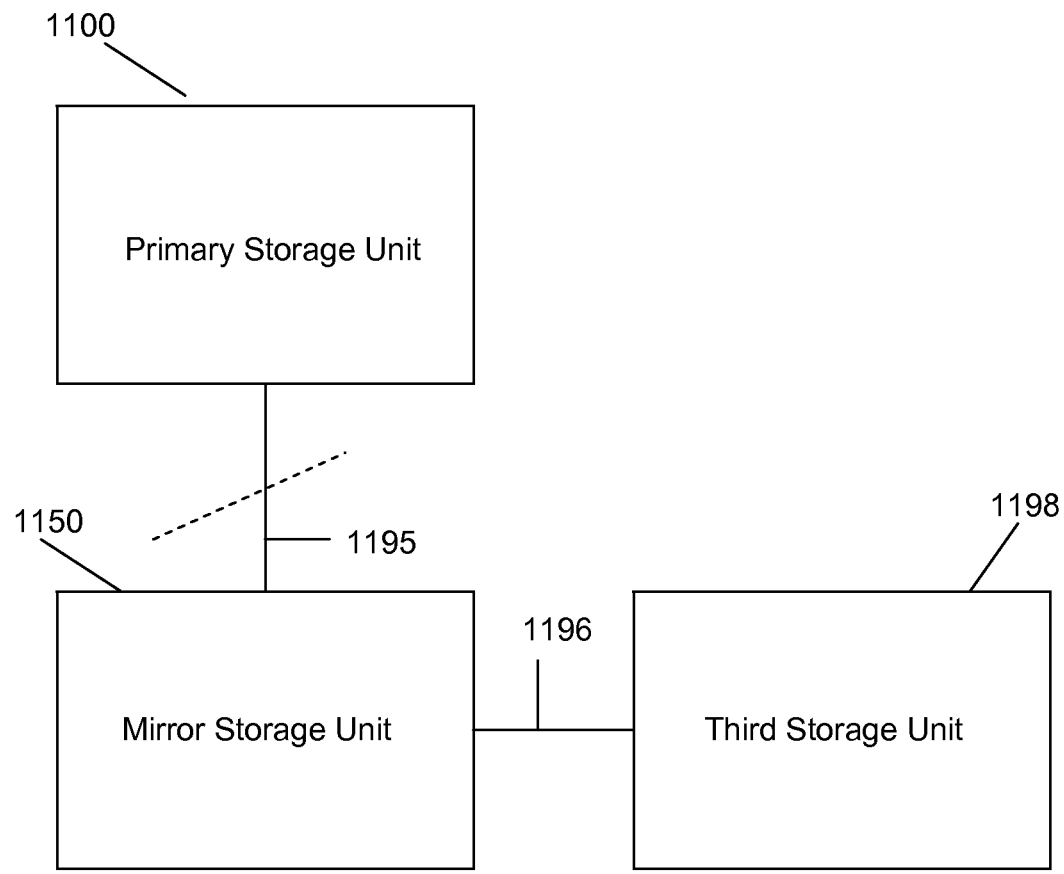
FIG. 11 depicts an exemplary backup system according to at least one exemplary embodiment of the present invention.

FIGS. 10 and 11 illustrate how offline backing up of data may occur. In step 1015 of FIG. 11, the connection 1195 between the primary storage unit 1100 and the secondary storage unit 1150 is broken. For instance, the connection 1195 may be broken (or disconnected from the primary storage unit 1100) by changing an IP address of the mirror storage unit

1150. It should be noted that database activity on the primary storage unit 1000 is first quiesced to provide a backup point in time in this exemplary embodiment. In step S1020, the mirror storage unit 1150 is configured as a source for a backup operation to be performed. In other words, a copy of the data on the mirror storage unit 1150 will be transferred to a third storage unit 1198. In step S1025, the third storage unit 1198 is configured as a target for the backup operation to be performed. In step S1030, the backup operation is performed and may, for example, be any of the various backup schemes described above. In step S1035, the mirror storage unit 1150 is preferably placed in an on-line status such that the connection 1195 with the primary storage unit 1100 is restored. In step S1040, the primary storage unit 1100 and the mirror storage unit 1150 are preferably resynchronized for data operations occurring since the mirror storage unit 1150 went offline by, for example, instructions stored in a buffer or comparison of hash tables. After the resynchronization, database activity on the system preferably resumes.

While the mirror storage unit 1150 is offline, the primary storage unit 1100 preferably continues to handle production operations and changed block numbers are in at least one exemplary embodiment above logged in buffers, for example, NVRAMs so that the mirror storage unit 1150 can be updated, that is, synchronized when it is brought back on-line after the backup has been completed. Alternatively, synchronizing can be accomplished by performing a hash table check to determine where changes have occurred and copying the relevant data to the mirror storage unit 1150 once it is reconnected. In at least one exemplary embodiment, the performance of the hash table check is done during periods of time when the level of activity on the primary storage unit is below a predetermined threshold to minimize the performance impact on the overall system performance.

The illustrated functional relationship during the backup is the mirror storage unit 1150 operates as a primary storage unit 1100, and the backup storage unit 1198 operates as a mirror storage unit through connection 1008 as illustrated in FIG. 11. Then software can be used to perform a complete, efficient re-synchronization of the mirror storage unit 1150 (which is now serving as a primary storage unit) to the backup storage unit 1198 (which is now serving as the secondary storage unit). After the backup has been accomplished, the mirror storage unit 1150 is disconnected from the backup storage unit 1198 and is reconnected to the primary storage unit 1100, and the system automatically updates the mirror storage unit 1150 to match the primary storage unit 1100, which continued production operations while backups were performed, by transmitting the instructions stored in the buffer of the primary storage unit 1100 to the mirror storage unit 1150.

Another exemplary backup method is to copy only the data segments (or blocks) that have different hash tables between the source storage unit and the backup storage unit. This will streamline and reduce the amount of data potentially being copied from the source storage unit to the backup storage unit, which has the benefit of increasing the speed at which the backup occurs. Instead of copying every data block in the storage unit, the backup time is reduced potentially to seconds depending upon the number of write transactions that occurred since the last backup.

An exemplary extension of the backup methodology includes a rotation of backup units and/or mediums. As described in connection with FIG. 10, the exemplary method includes a nightly backup of the data contained in the system. That exemplary method can be extended to include thirty-three backup storage units to allow for a rotation of seven backup storage units for performing daily backups (this could be decreased to five if backups done on weekdays), four backup storage units for providing a rotation of four backup storage units for weekly backups, twelve backup storage units for providing a rotation of twelve backup storage units for monthly backups, and ten backup storage units for providing a rotation of ten backup storage units for annual backups. An exemplary way to switch between backup storage units is by switching the IP address of the backup storage unit just used and the next one in the rotation. Alternatively, the reassignment of the IP address is done in a preassigned order can be done almost immediately after completion of the backup. Alternatively, the labeling of the backup storage unit may rotate through a pattern of DNS hostnames: "yesterday", "two days ago", the name of a day (e.g., Sunday, Monday, etc.), "last week", two weeks ago", "three week ago", "four weeks ago", "last month", the name of the month (e.g., January, February, etc.), and identification of the year. This labeling scheme maintains a logical view that is user friendly rather than a physical view using IP addresses for the backup domain space.

An advantage to this type of arrangement is a wealth of old data is readily accessible for data mining and quick restoration if the user knows from which backup they wish to restore from. A variety of combinations may be utilized in terms of numbers of units for providing desired backup rotation scenarios depending upon the desired backup strategy, for example, the strategy could stop at the monthly level or only maintain five years of backups. The rotation scenarios could increase the frequency of backups such that instead of a daily backup, the backup would occur every 4, 6, 8, or 12 hours depending upon the size of the backup and transaction load and activity of the overall system.

A hybrid approach is to have one backup storage unit and in place of the described rotation sets using tape backup or other medium. This arrangement provides for at least a twenty hour window (if not a window in excess of twenty-three hours) for moving a daily backup to tape storage. The window should provide sufficient time to move the data offline from the backup storage unit to the slower tape drives while allowing rotation of the backup tapes or other medium. The tape or other medium storage is cost effective although it has the drawback of removing the previous backups offline, which leads to a slower restoration process.

Another approach combines the two above-described approaches and places older backups onto tape or other medium to save on the expense of maintaining multiple backup storage units.

Figure 12:
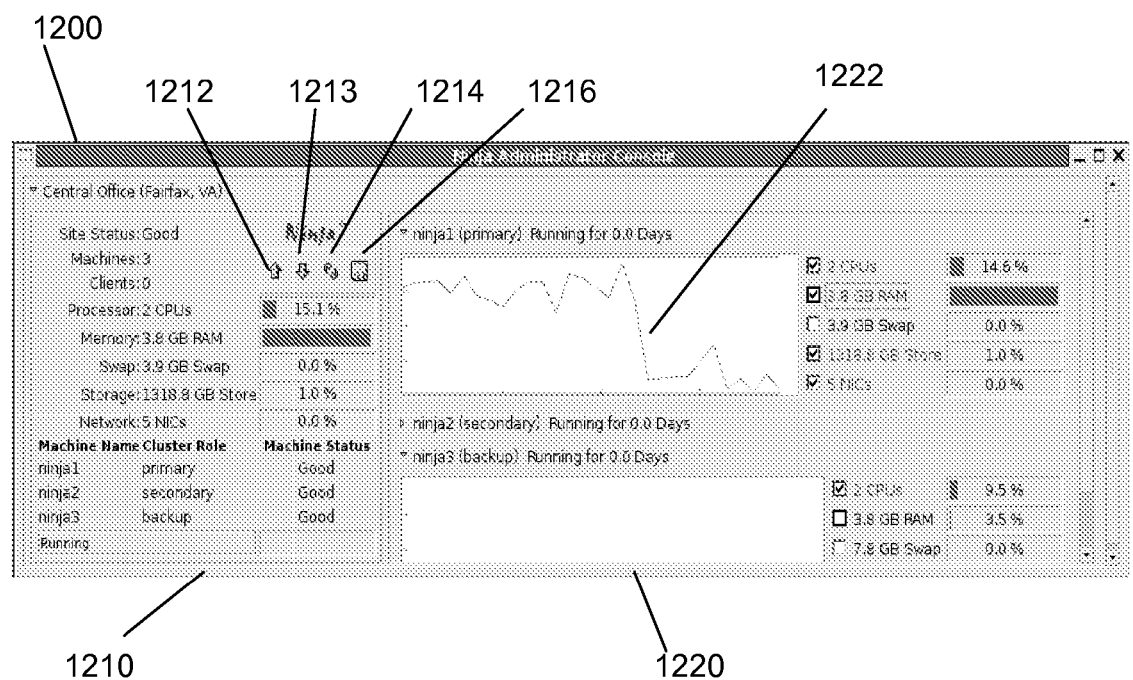
FIG. 12 illustrates a user interface according to an embodiment of the invention.

FIG. 12 illustrates an exemplary user interface 1200 for monitoring the performance of a storage system having a primary storage unit, a secondary storage unit, and a backup storage unit. As illustrated in this exemplary implementation, each storage unit includes a pair of CPUs, 3.8 gigabyte of RAM, approximately 1.3 terabyte of storage, and five network interface cards. The interface is divided into two portions: an overall summary portion 1210 and a detailed view portion 1220 of individual storage units. The overall summary portion 1210 includes a breakdown of the number of storage units in the network and detailed information about one select storage unit whose selection is controlled by selection arrows 1212, 1213. The exemplary interface includes the ability for the user to swap network identifications of the storage units by selection of the swap icon 1214. If a user needs to perform a manual backup in the system, they can select the backup icon 1216. The overall summary portion 1210 includes an identification of the roles of the storage units in the network and their respective machine status.

The detailed view portion 1220 allows the user to select a particular storage unit by selecting the desired unit to display detailed information including a line graph 1222 indicating usage level. In the illustrated interface, the detailed view portion 1220 replicates information contained in the summary portion 1210, but allows the user to have detailed information displayed for selected storage units and then be able to scroll through a list. One of ordinary skill in the art will appreciate based upon this disclosure that the user interface can display a variety of information about the status and capabilities of individual components of the storage network.

Figure 13:
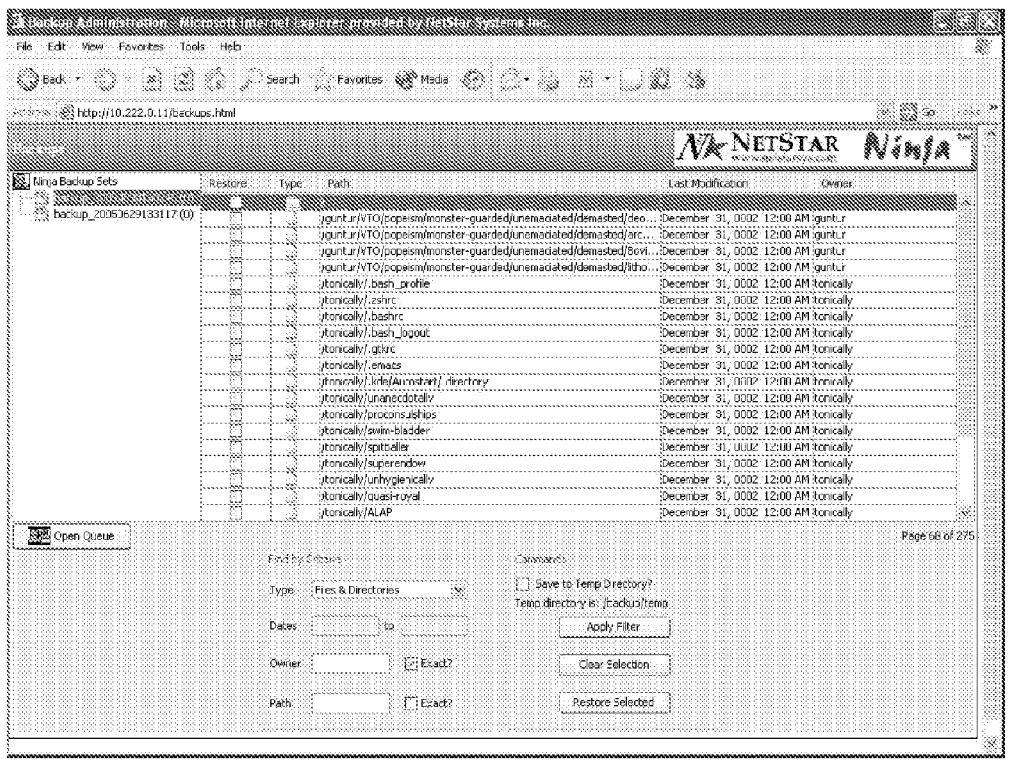
FIG. 13 illustrates a user interface according to an embodiment of the invention.

FIG. 13 illustrates an exemplary web accessible user interface for recovering previously backed up files from the backup storage unit(s). The user would enter the appropriate IP address for the backup that has the file(s) that the user wants to restore. The exemplary interface includes a search function to assist in locating the particular file, and allows the user to save the search as a filter for latter use. A list of files is provided including identification of file path, modification date, and owner although other file attributes could be displayed. The user would select the file or files that they want to restore and in at least one exemplary embodiment allow them to save the files to a location other than the file path to avoid replacing the version of the file(s) currently available. The illustrated interface also includes a list of available backup sets to retrieve files from. One of ordinary skill in the art will appreciate that the access to the backup files can be limited based upon the network/computer rights of a particular user.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

These computer program instructions may also be stored in a computer-readable memory that can direct a computer or other programmable data processing apparatus to function in a particular manner, such that the instructions stored in the computer-readable memory produce an article of manufacture including instruction means or program code that implements the function specified in the flowchart block or blocks.

The computer program instructions may also be loaded, e.g., transmitted via a carrier wave, to a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As is known to those of ordinary skill in the art, network environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or an Extranet, as well unless otherwise noted. The term "computer network" shall incorporate publicly accessible computer networks and private computer networks.

The exemplary and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A storage system comprising:
   a first storage unit having
      intercepting means for intercepting data operations received by said first storage unit,
      a storage array in communication with said intercepting means, and
      a buffer connected to said intercepting means, said buffer stores write operations for latter transmission to said second storage unit;
   a second storage unit having a storage array;
   a third storage unit having a storage array; and
   means for controlling said communication links between said first storage unit, said second storage unit, and said third storage unit such that said first storage unit and said second storage unit are set to be in communication during normal operations and said second storage unit and said third storage unit are in communication during a back-up period of time; and said intercepting means sends data operations performing a write to said second storage unit and said storage array of said first storage unit, and said buffer and said first storage array in said first storage unit provide two discrete communication paths for data operations to travel where one communication path is between said intercepting means through said buffer on said first storage unit to said second storage unit when said second storage unit is in communication with said first storage unit and said second communication path is from said intercepting means to said storage array in said first storage unit, wherein said communication path between said intercepting means and said buffer is on a dedicated connection isolated from said second communication path.

2. The storage system according to claim 1, wherein said first storage unit further includes a hash table check daemon connected to said storage array of said first storage unit and in communication at least fifty percent of said time with said storage array of said second storage unit to facilitate synchronization when a difference in at least one pair of hash tables exists between said storage array of said first storage unit and said storage array of said second storage unit.

3. The storage system according to claim 1, further comprising a card with a central processing unit and said buffer, said card in said first storage unit, said card when said first storage unit crashes reboots to allow for transmission of any remaining data operations to said second storage unit.

4. A storage system comprising:
a first storage unit having
a kernel module capable of receiving data instructions received by said first storage unit,
a buffer in communication with said kernel module, and
a storage array in communication with said kernel module,
a second storage unit having a storage array,
a third storage unit having a storage array, and
means for controlling said communication links between said first storage unit, said second storage unit, and said third storage unit such that said first storage unit and said second storage unit are set to be in communication during normal operations and said second storage unit and said third storage unit are in communication during a back-up period of time; and
said kernel module is capable of sending data operations performing a write to said second storage unit and said storage array of said first storage unit, and
wherein said buffer and said first storage array in said first storage unit provide two discrete communication paths for data operations to travel where one communication path is between said kernel module through said buffer on said first storage unit to said second storage unit when said second storage unit is in communication with said first storage unit and said second communication path is from said kernel module to said storage array in said first storage unit, wherein said communication path between said kernel module and said buffer is on a dedicated connection isolated from said second communication path.

5. The storage system according to claim 4, wherein said first storage unit further includes a hash table check daemon connected to said storage array of said first storage unit and in communication at least fifty percent of said time with said storage array of said second storage unit to facilitate synchronization when a difference in at least one pair of hash tables exists between said storage array of said first storage unit and said storage array of said second storage unit.

6. The storage system according to claim 4, further comprising a card with a central processing unit, said card in said first storage unit, said card when said first storage unit crashes reboots to allow for transmission of any remaining data operations to said second storage unit.

7. The storage system according to claim 4, wherein said second storage unit further includes
a kernel module capable of receiving data instructions received by said second storage unit, said kernel module is in communication with said storage array of said second storage unit, and
a buffer in communication with said kernel module of said second storage unit; and
wherein said buffer and said second storage array in said second storage unit provide two discrete communication paths for data operations to travel where one communication path is between said kernel module through said buffer on said second storage unit to said third storage unit when said third storage unit is in communication with said second storage unit and said second communication path is from said kernel module to said second storage array, wherein said communication path between said kernel module and said buffer is on a dedicated connection isolated from said second communication path.

8. A storage system comprising:
a first storage unit having
a kernel module capable of receiving data instructions received by said first storage unit,
a buffer in communication with said kernel module, and
a storage array in communication with said kernel module,
a second storage unit having a storage array, and
means for controlling said communication links between said first storage unit and said second storage unit such that said first storage unit and said second storage unit are set to be in communication during normal operations and said first storage unit and said second storage unit are not in communication during a back-up period of time; and
wherein said buffer and said first storage array in said first storage unit provide two discrete communication paths for data operations to travel where one communication path is between said kernel module through said buffer on said first storage unit to said second storage unit when said second storage unit is in communication with said first storage unit and said second communication path is from said kernel module to said storage array in said first storage unit, wherein said communication path between said kernel module and said buffer is on a dedicated connection isolated from said second communication path.

9. The storage system according to claim 8, wherein said first storage unit further includes a hash table check daemon connected to said storage array of said first storage unit and in communication at least fifty percent of said time with said storage array of said second storage unit to facilitate synchronization when a difference in at least one pair of hash tables exists between said storage array of said first storage unit and said storage array of said second storage unit.

10. The storage system according to claim 8, further comprising a card with a central processing unit, said card in said first storage unit, said card when said first storage unit crashes reboots to allow for transmission of any remaining data operations from said buffer to said second storage unit.

11. The storage system according to claim 1, wherein said second storage unit further includes
   a kernel module capable of receiving data instructions received by said second storage unit, said kernel module is in communication with said storage array of said second storage unit, and
   a buffer in communication with said kernel module of said second storage unit; and
   wherein said buffer and said second storage array in said second storage unit provide two discrete communication paths for data operations to travel where one communication path is between said kernel module through said buffer on said second storage unit to said third storage unit when said third storage unit is in communication with said second storage unit and said second communication path is from said kernel module to said second storage array, wherein said communication path between said kernel module and said buffer is on a dedicated connection isolated from said second communication path.

12. The storage system according to claim 1, wherein said first communication path includes only a communication flow in one direction from said intercepting means to said buffer.

13. The storage system according to claim 1, wherein said first communication path is such that once an instruction sent from said intercepting means to said buffer, the instruction does not return to said intercepting means from said buffer.

14. The storage system according to claim 3, wherein said buffer includes a non-volatile memory, and
   said card further includes a power supply.

15. The storage system according to claim 4, wherein said first communication path includes only a communication flow in one direction from said kernel module to said buffer.

16. The storage system according to claim 4, wherein said first communication path is such that once an instruction sent from said kernel module to said buffer, the instruction does not return to said kernel module from said buffer.

17. The storage system according to claim 6, wherein said card further includes said buffer connected to said central processing unit and a power supply.

18. The storage system according to claim 8, wherein said first communication path includes only a communication flow in one direction from said kernel module to said buffer.

19. The storage system according to claim 8, wherein said first communication path is such that once an instruction sent from said kernel module to said buffer, the instruction does not return to said kernel module from said buffer.

20. The storage system according to claim 10, wherein said buffer is a non-volatile memory, and
   said card includes a power supply and said non-volatile memory in communication with said central processing unit.

* * * * *